US012467697B2

(12) United States Patent
Vesin et al.

(10) Patent No.: US 12,467,697 B2
(45) Date of Patent: Nov. 11, 2025

(54) MODULE FOR THERMAL STORAGE BY A PHASE-CHANGE MATERIAL WHOSE MANUFACTURE IS SIMPLIFIED

(71) Applicants: COMMISSARIAT A L'ENERGIE ATOMIQUE ET AUX ENERGIES ALTERNATIVES, Paris (FR); GRIMS, Villette d'anthon (FR)

(72) Inventors: Sébastien Vesin, Grenoble (FR); Fabrice Bentivoglio, Grenoble (FR); Raphael Couturier, Grenoble (FR); Cyrille Grimaud, Villette d'anthon (FR); Louane Grimaud, Villette d'anthon (FR)

(73) Assignees: COMMISSARIAT A L'ENERGIE ATOMIQUE ET AUX ENERGIES ALTERNATIVES, Paris (FR); GRIMS, Villette d'Anthon (FR)

( * ) Notice: Subject to any disclaimer, the term of this patent is extended or adjusted under 35 U.S.C. 154(b) by 606 days.

(21) Appl. No.: 17/559,666

(22) Filed: Dec. 22, 2021

(65) Prior Publication Data

US 2022/0228815 A1    Jul. 21, 2022

(30) Foreign Application Priority Data

Dec. 23, 2020  (FR) .................................. 2014038

(51) Int. Cl.
*F28D 20/02*  (2006.01)
*F28F 13/00*  (2006.01)
*F28D 20/00*  (2006.01)

(52) U.S. Cl.
CPC .......... *F28D 20/023* (2013.01); *F28F 13/003* (2013.01); *F28D 2020/0013* (2013.01); *Y02E 60/14* (2013.01)

(58) Field of Classification Search
CPC ................. F28D 20/021; F28D 20/023; F28D 2020/0013; F28D 2020/0017; F28F 13/003; Y02E 60/14
See application file for complete search history.

(56) References Cited

U.S. PATENT DOCUMENTS

2008/0099187 A1* 5/2008 Rini ..................... F28D 20/023
                                                        165/104.17
2012/0055661 A1* 3/2012 Feher .................... F28D 20/021
                                                        165/181

(Continued)

FOREIGN PATENT DOCUMENTS

CN       111765791 A    10/2020
EP       2 904 343        8/2015

(Continued)

OTHER PUBLICATIONS

French Preliminary Search Report Issued Sep. 10, 2021 in French Application 20 14038 filed on Dec. 23, 2020 (with English Translation of Categories of Cited Documents), 2 pages.

*Primary Examiner* — Eric S Ruppert
*Assistant Examiner* — Hans R Weiland
(74) *Attorney, Agent, or Firm* — Oblon, McClelland, Maier & Neustadt, L.L.P.

(57) ABSTRACT

A module for thermal storage by a phase-change material includes a vat, at least one heat-exchanger having first and second connecting ends configured to be connected to a heat-transfer fluid network, the first and second connecting ends penetrating and opening into the vat, and a structure received in the vat and configured to contain a phase-change material. The structure includes a porous matrix made of a metallic material with communicating cells crossed by the heat-exchanger and in contact with the external surface of the heat-exchanger. The matrix is obtained by moulding around the heat-exchanger. The vat includes at least one wall (Continued)

made of a metallic material formed directly during moulding and integral with the matrix.

18 Claims, 8 Drawing Sheets

(56) References Cited

U.S. PATENT DOCUMENTS

| | | | |
|---|---|---|---|
| 2015/0369542 A1* | 12/2015 | Minvielle | F28D 20/028 165/10 |
| 2016/0209124 A1* | 7/2016 | Da Silva | C01B 32/16 |
| 2020/0249294 A1* | 8/2020 | Xue | H05K 7/20354 |
| 2020/0258811 A1* | 8/2020 | Joshi | H05K 7/20936 |
| 2023/0221081 A1* | 7/2023 | Vesin | F28F 13/003 165/10 |

FOREIGN PATENT DOCUMENTS

| | | |
|---|---|---|
| WO | WO 2014/056857 A1 | 4/2014 |
| WO | WO 2015/189450 A1 | 12/2015 |
| WO | WO 2016/051377 A1 | 4/2016 |

* cited by examiner

MODULE FOR THERMAL STORAGE BY A PHASE-CHANGE MATERIAL WHOSE MANUFACTURE IS SIMPLIFIED

TECHNICAL FIELD AND PRIOR ART

The present invention relates to a system for thermal storage by a phase-change material that is simple to manufacture.

Systems for thermal storage by a phase-change material find application in many fields, for example in heat storage in solar plants and in heat and/or cold networks, urban networks, industrial networks.

Particularly interesting thermal storage systems are the systems implementing a tube and grill exchanger including a grill or vat filled with phase-change material and tubes crossing the vat and connected to a heat-transfer fluid source. By flowing in the tubes, the heat-transfer fluid exchanges heat with the phase-change material. During a load phase, the heat-transfer fluid reaches a temperature higher than the melting temperature of the phase-change material and transfers energy thereto, which causes the meltdown of the phase-change material, the heat-transfer fluid leaves the system at a temperature lower than its inlet temperature. During an unload phase, the heat-transfer fluid enters the system at a temperature lower than the melting temperature of the phase-change material and recovers the energy stored beforehand, which causes the solidification of the phase-change material. The heat-transfer fluid leaves the system at a temperature higher than its inlet temperature.

Yet, phase-change materials have the drawback of having a low thermal conductivity, for example in the case of octadecanol the average thermal conductivity is in the range of 0.3 W/mK, a typical value of lowly-conductive, and possibly heat-insulating, materials.

Hence, the thermal conduction between the heat-transfer fluid and the phase-change material should be optimised. One of the methods commonly used for this purpose is the tube and grill type storage consisting of a vat integrating a tube harness often provided with fins to diffuse heat. However, in order to keep a reasonable manufacturing cost, the finned tubes that are used often consist of finned tubes standard in particular in the field of petrochemicals having fins with a relatively small diameter, for example in the range of 5 cm, which implies using a large number of finned tubes to sufficiently diffuse heat in the phase-change material. Yet, this large number of tubes should be assembled to the upper and lower collector plates of the grill, for example by welding of expanding. This implies a considerable manufacturing time and a high manufacturing cost. Furthermore, the risks of leakage are increased.

Furthermore, because of the circulation of the heat-transfer fluid in a large number of tubes, this has a reduced velocity, which, in some cases, might require the implementation of special devices, called inserts, in the tubes, complexifying the manufacture of the tubes and increasing the cost of the thermal storage system.

The document EP2904343 describes a thermal storage system including a grill, tubes and inserts made of aluminium affixed on the external face of the tubes and diffusing heat within the phase-change material, which allows reducing the number of tubes. However, there is a gap between the tube and the insert, which penalises the heat transfer between the tube and the insert.

DISCLOSURE OF INVENTION

Consequently, the present invention aims to provide a module for thermal storage by a phase-change material that is simple to make and offering improved performances.

The goal set out hereinabove is achieved by a module intended for thermal storage by a phase-change material including a vat, one or several heat-exchanger(s) including connecting ends penetrating into and opening onto the vat, a porous matrix with open pores and with a high void ratio crossed by the heat-exchanger(s) and in tight contact with the external face of the heat-exchangers, said matrix being obtained by direct moulding around the heat-exchanger(s), said porous matrix being intended to be filled with a phase-change material. The vat comprises at least one wall formed by moulding directly on the matrix.

In a particularly advantageous example, the wall is made of the metallic material of the matrix and obtained directly during moulding of the matrix.

Making at least one wall of the vat directly during moulding simplifies the manufacturing method.

In another example, the wall is moulded over the foam after moulding thereof, for example the wall is made of a different material, advantageously of a material offering heat-insulation properties with respect to the foam. For example, the wall is made of borosilicate glass or of soda-lime glass.

Quite advantageously, this wall is crossed by the connecting ends of the heat-exchanger(s). It is then no longer necessary to affix at least one end plate on the connecting ends and to assemble them tightly on these. The manufacturing method is simplified.

In one example, the heat-exchangers consist of tubes and the connecting ends are the ends of the tubes. In another example, the heat-exchangers consist of exchanger plates, and the connecting ends consist for example of the tubes affixed on the edges of the plates and ensuring the supply and the evacuation of the heat-transfer fluid. Alternatively, a distribution chamber and a collection chamber are provided at the ends of the exchanger plates.

The implementation of a porous structure made of a metallic material ensures a very good diffusion of heat within the phase-change material. The efficiency of loading and unloading is improved. Furthermore, the number of tubes may be reduced, which allows avoiding the need for inserts in the tubes, and the manufacturing cost could be reduced. Quite advantageously, the porous matrix or foam includes a first area between the tubes having a first porosity and in contact with the tubes, and a second area with a second porosity surrounding the first area and with a porosity substantially lower than the first porosity. This matrix ensures a very good thermal conduction between the tubes and the matrix reducing the amount of phase-change material in contact with the tubes, the phase-change material having a low thermal conductivity. In other words, the tubes are surrounded by a layer of a lowly-porous metallic material forming an overthickness around the tubes and adhering to the tubes. Furthermore, holding of the metallic structure around the tubes is improved.

A very advantageous example, the modules according to the invention can be easily fluidly connected together and can be easily stacked and/or juxtaposed, the modules could, quite advantageously, be made in a parallelepiped shape.

In one example, the matrix is equipped, at least at one of its edges, with an upright. Besides, several uprights are preferably implemented, for example four parallel uprights arranged at the four edges directed vertically on the module. Several functions could be filled by these uprights, either integrated directly to the edges of the porous matrix during mounting thereof, or integrated to this matrix after moulding thereof. The uprights allow simplifying, and possibly reinforcing the assembly and the structure of the thermal storage modules. On the other hand, the uprights could fill a mechanical function of structural reinforcement of the storage module, in particular by allowing distributing the stresses on an affixed frame. Furthermore, these uprights are capable of conferring a better mechanical strength in case of stacking of the modules, and/or a reinforced resistance to the pressure of the vat. The integration of these uprights also allows facilitating setting and clamping of walls to form the vat.

It is possible to consider making more than one face of the vat directly during moulding for example all of its faces except one. In the case of a parallelepiped-shaped vat, five of the six faces may be made by moulding directly on the matrix, the sixth face allowing filling of the structure with the phase-change material and allowing for example clearing a volume to enable a free variation of the volume of the phase-change material during the phase changes thereof.

One of the objects of the present invention is a module for thermal storage by a phase-change material including a vat, at least one heat-exchanger including first and second connecting ends intended to be connected to a heat-transfer fluid network, said first and second connecting ends penetrating and opening into the vat, a structure received in the vat and intended to contain a phase-change material, said structure comprising a porous matrix with communicating cells crossed by said heat-exchanger and in contact with the external surface of said heat-exchanger, said matrix being obtained by moulding around said heat-exchanger, said vat comprising at least one wall made of a material formed by moulding directly on the porous matrix.

In one embodiment, the wall is formed directly during moulding of the matrix and integral with the matrix.

In another embodiment, the wall is formed on the matrix after moulding thereof. For example, the at least one wall is made of a material having a thermal conductivity lower than that of the matrix.

Preferably, said wall is crossed by at least the first end of said heat-exchanger.

For example, the porous matrix is made of a metallic material, for example of aluminium or of an aluminium alloy.

In an advantageous example, the matrix includes a first area with a first porosity in contact with the external surface of the heat-exchanger and a second area with a second porosity surrounding the first area, the second porosity being higher than the first porosity.

The module may include several heat-exchangers configured to be connected in parallel to a heat-transfer fluid network and wherein the first connecting ends are connected to a hydraulic feeder and the second connecting ends are connected to a second hydraulic feeder.

For example, said heat-exchanger is a tube. The tube may be configured so as to wind in the matrix.

In one example, the module includes several tubes, each tube being contained in a plane, said planes being substantially vertical, and said tubes are configured to be connected in parallel to a heat-transfer fluid network.

In another example, the module includes several tubes, each tube being contained in a plane, said planes being substantially horizontal and wherein said tubes are connected in series. Preferably, the tubes are connected by connectors disposed outside the matrix. Advantageously, the matrix is parallelepiped shaped. Advantageously, the vat includes five walls in contact with a face of the matrix and a wall distant from a matrix face so as to clear a free volume between said face and said wall. The free volume may form an inert gas cloud and/or a buffer area for the expansion of the phase-change material.

Preferably, said five walls are made of a metallic material formed directly during moulding and integral with the matrix or are formed on the matrix after moulding thereof.

Another object of the present invention is a thermal storage system including at least one module according to the invention and phase-change material filling the cells of the matrix.

Said module may include at least two heat-exchangers and each exchanger may be supplied with a heat-transfer fluid that is different or originating from a different heat network.

Advantageously, the thermal storage system includes several modules, part of the modules being stacked and/or another part of the modules being juxtaposed.

For example, the modules are connected to a heat-transfer fluid network in parallel.

Another object of the present application is a method for manufacturing a module according to the invention, including:
the provision of a preform comprising plates of cores and at least one heat-exchanger between the cores,
set-up of the preform in a mould,
introduction of a liquid metal in the preform,
solidification of the metal,
removal of the cores.

The preform may include a free volume between the cores and the heat-exchanger.

Other advantages and features of the invention will appear in the non-limiting detailed description hereinbelow.

BRIEF DESCRIPTION OF THE DRAWINGS

The present invention will be better understood based on the following description and the appended drawings wherein.

DETAILED DISCLOSURE OF PARTICULAR EMBODIMENTS

Figure 1A:
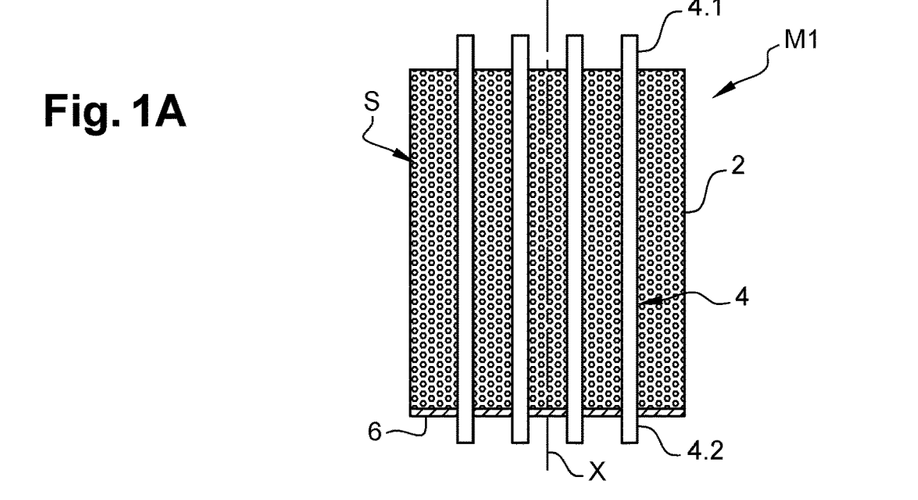
FIG. 1A is a schematic representation of a longitudinal sectional view of an example of a thermal storage module with a phase-change material of a thermal storage system.

In FIG. 1A, a longitudinal sectional view can be seen of an example of a thermal storage module M1 with a phase-change material of a thermal storage system.

A thermal storage system may include one or several thermal storage module(s) as it will be described hereinbelow.

The module M1 includes a grill or vat 2 extending according to a longitudinal axis X, tubes 4 disposed in the vat 2, in this example the tubes 4 extending along the longitudinal direction X, a structure S in the vat, crossed by the tubes 4 and containing a phase-change material PCM. One end of the tubes 4 is intended to be connected to a hot heat-transfer fluid source or to a system for using a hot heat-transfer fluid, and one end of the tubes is intended to be connected to a cold heat-transfer fluid tank or to a system for using a cold heat-transfer fluid.

In general, the external faces of the vat of the module are covered by a heat-insulating material forming a heat insulator (not represented) to reduce thermal losses from the module to the outside.

In the present application, by "hot heat-transfer fluid", it should be understood a heat-transfer fluid at a temperature higher than the melting temperature of the phase-change material, it can therefore transfer energy to the phase-change material, and by "cold heat-transfer fluid", it should be understood a heat-transfer fluid at a temperature lower than the crystallisation temperature of the phase-change material, it can therefore extract energy from the phase-change material.

For simplification, the phase-change material will be referred to as PCM material in the following description.

For example, the PCM material is selected amongst paraffins, fatty alcohols, fatty acids, sugar alcohols, salt hydrates . . . .

The heat-transfer fluid may be liquid when it is hot and when it is cold, the fluid then does not change its phase during the phases of loading and unloading the module, or be in the form of a vapor when it is hot and liquid when it is cold, a phase change of the heat-transfer fluid then occurring during the load and unload phase.

Figure 1B:
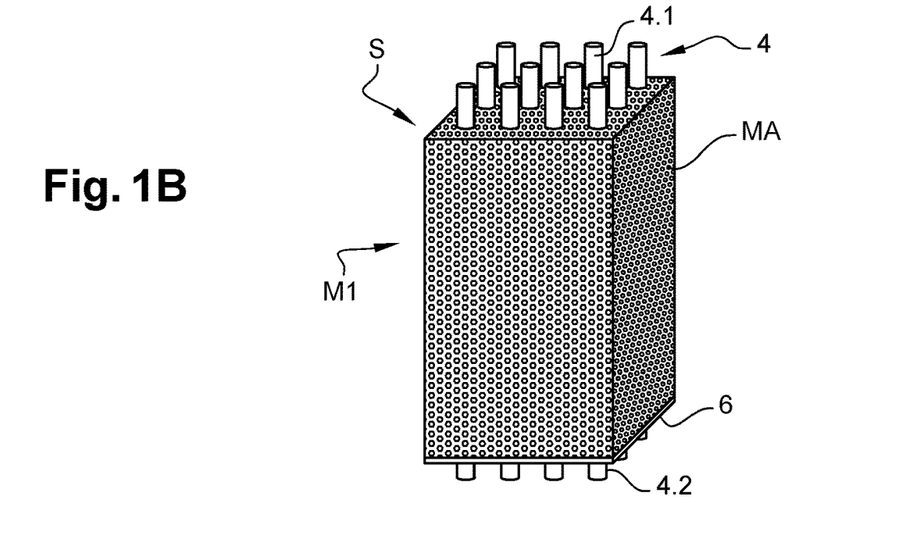
FIG. 1B is a schematic representation of the inner structure of the module of FIG. 1A.

In FIG. 1B, the schematic representation can be seen of the structure S of the storage module of FIG. 1A.

The structure S includes a matrix MA made of cellular, porous foam, which could be metallic. This foam is composed by a plurality of open cells, communicating with each other and opening onto the outside of the matrix. The cellular structure is a stochastic structure or a regular, orderly structure, homogeneous or not. For example, the cells consist of zonohedrons, for example Kelvin cells, which have a truncated octahedron shape, and are connected together by strands.

Figure 1C:
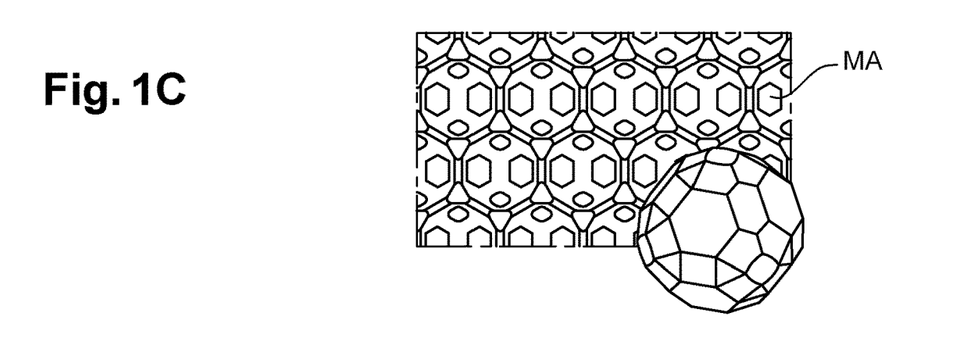
FIG. 1C is a photograph of an example of a matrix that could be implemented in the thermal storage module.

In FIG. 1C, a representation of an example of a matrix can be seen. The average diameter of the cells may be comprised between 10 mm and 100 mm and the strands have a thickness of a few mm.

The matrix MA may also include cells having geometric variants with respect to each other. The cells may have other shapes, cylindrical, parallelepiped, with a polyhedral base, in particular with an octagonal, or square base, or other.

Preferably, the pores have an average diameter comprised between 10 mm and 100 mm. Also preferably, the thickness of the strands is in the range of a few millimetres.

In one embodiment, the material of the matrix is metallic, for example of aluminium, of an aluminium alloy, of a nickel-based alloy or of steel cast iron. Metallic materials have the advantage of offering a high thermal conductivity.

In another embodiment, the matrix is made of a non-metallic material, for example of borosilicate glass, of soda-lime glass, of composite or of any other material compatible with the manufacturing method described and implemented to obtain the matrix MA. The material is selected so as to be compatible with the PCM material and so as to be compatible with the operating temperatures of the storage system.

The matrix MA is made by monolithic and monolayer overmoulding around the tubes 4 thereby ensuring a high adhesion between the porous matrix MA and the tubes 4, improving heat transfer from the tubes to the structure and from the structure to the tubes. The matrix MA is made by a moulding process implementing a preform made from cores. An example of a manufacturing method will be described hereinbelow.

The tubes may be made of carbon steel, of stainless steel or any other material having a sufficient melting temperature to withstand the melting temperature of the material of the matrix during the moulding process.

The implementation of a porous matrix to diffuse heat in the PCM material or to extract it allows reducing, and possibly suppressing the PCM material areas that would be difficult to access thermally and would not therefore participate in thermal storage.

Figure 2:
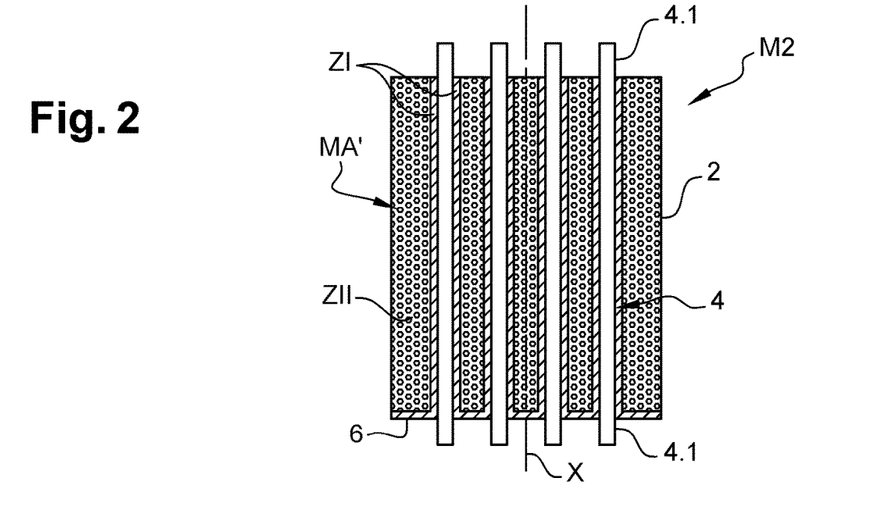
FIG. 2 is a schematic representation of another example of a portion of a module of a thermal storage system according to the invention.

Quite advantageously and as represented in FIG. 2 showing a cross-sectional view of an example of a thermal storage module M2, moulding of the matrix MA' around tubes 4 is such that the areas ZI of the matrix surrounding the tubes and proximate to these have a substantially lower porosity than those of the areas ZII away from the tubes, forming a lowly-porous metallic material sheath surrounding the tubes 4 and in contact with these. For example, the areas ZII of the matrix away from the tubes have a porosity comprised between 80% and 95% and the porosity of the areas ZI is comprised for example between 0% and a few %.

The porosity of a cellular structure may be calculated as follows: the mass m1 of the cellular structure is measured in kg. The cellular structure is placed in a vessel and completely immersed in water which is poured up to a given graduation. The mass m2 of the whole formed by the cellular structure and water is measured in kg. The vessel is emptied and then filled only with water up to said graduation. The mass m3 of water is measured in kg.

The volume of the cellular structure $V_{sol}$ is determined in litres (l).

The void ratio ε is calculated according to the following equation, where ρ is the volumetric mass of water in kg/l:

$$\varepsilon = 1 - \frac{m_3 - (m_2 - m_1)}{\rho V_{sol}} \quad \text{[Math 1]}$$

The low-porosity areas ZI allow reducing, and possibly suppressing, the presence of PCM material directly in contact with the tubes, the PCM material generally having a low thermal conductivity. In addition, these areas ZI allow improving the heat transfers in the different directions of the matrix, these areas homogeneously surrounding the tubes. Making of these areas ZI forming an overthickness on the tubes is obtained by providing in the preform for free volumes around the tubes, these free volumes further promoting the flow and the distribution of the melting material inside the mould during casing of the liquid metal.

For example, the overthickness has a thickness of a few millimetres. For example, it has a thickness between 5 mm and 10 mm, for tubes with a diameter of 17.2 mm and with a thickness of 2 mm.

Preferably, the tubes are made of a material different from that of the matrix, the matrix of the tubes being adapted to withstand the pressure of the heat-transfer fluid, and suited to the heat-transfer fluid.

In one embodiment, the structure S also includes at least one external wall 6 of the grill made integrally in one-piece with the porous matrix and simultaneously with the latter. The preform and the mould are designed for the formation of the wall 6 during moulding of the matrix. The external wall 6 is formed of the same material as the matrix MA and is made of a solid material, i.e. it is such that it is tight to the PCM material. Making the wall in the same material as that of the matrix has the advantage of enabling a simplified implementation. Furthermore, the difficulties related to differences in expansion coefficient values are limited.

In another embodiment, the external wall 6 is formed in a material different from that of the matrix MA. Advantageously, this making allows having a solid wall 6 made of a material that is less heat-conductive than the matrix MA so as to limit the thermal losses of the storage module to the outside. The external wall 6 is made of another material compatible with making of the matrix MA and which enables it to preserve its qualities of tightness to the PCM material, of mechanical resistance to the pressure exerted by the inside of the storage module, of compatibility with the PCM material within the range of temperatures of use of the storage module.

For example, in the case where the material of the wall 6 has a melting temperature lower than that of the material of the matrix MA, the operating mode of making of the module may consist in casting at first the molten material composing the matrix MA and then letting the matrix MA cool down until its temperature becomes lower than the melting temperature of the material of the wall 6 in order to cast at second the molten material composing the wall 6. Thus, the preforms are designed so as to delimit the two areas, i.e., the matrix MA and the wall 6 and to enable casting of the two different materials in two steps in each of the distinct areas. According to another embodiment, preforms that are specific to making of the solid wall 6 could be affixed after making of the matrix MA. For example, the wall 6 may be made of glass, for example of borosilicate glass, or of soda-lime glass, of a composite or organic material, for example of rubber or of any other material advantageously having for example a lower thermal conductivity than the matrix MA, and possibly a better mechanical strength or a better ability for thermo-mechanical deformation or a better tightness to the PCM material.

One of the advantages of making at least one wall in a material different from that of the matrix is to use a less heat-conductive material for the wall. For example, the matrix MA may be made of cast aluminium alloys most of them having thermal conductivities at 20° C. in the range from 120 $W \cdot m^{-1} \cdot K^{-1}$ to 160 $W \cdot m^{-1} \cdot K^{-1}$.

As an example, the thermal conductivity at 20° C. of the cast aluminium alloy A-S7G06 is equal to 160 $W \cdot m^{-1} \cdot K^{-1}$ and that of the aluminium alloy A-S5U3G is equal to 120 $W \cdot m^{-1} \cdot K^{-1}$. The wall may be made of a material that is more heat-insulating than aluminium and its alloys, for example of borosilicate glass having a thermal conductivity at 20° C. equal to 1.2 $W \cdot m^{-1} \cdot K^{-1}$ or of steel cast iron having a thermal conductivity at 20° C. equal to 55 $W \cdot m^{-1} \cdot K^{-1}$. The thermal conductivity of solids may be measured directly or indirectly, i.e. by measuring their thermal diffusivity, which implies also knowing their volumetric mass and their specific heat. The measurement of the thermal conductivity may be performed by the hot-wire or hot-disk method, whereas the measurement of the thermal diffusivity Preferably, the material of the matrix and the material of the wall 6 are selected so that their thermal expansion coefficients are close enough to limit differential expansions between the matrix and the wall.

For example, aluminium, steel and cast iron may be used to form the matrix and/or the solid walls. The values of linear expansion coefficients as a function of time of materials are given hereinbelow:

Aluminium: $23 \times 10^{-6}$ $K^{-1}$
Steel: $12 \times 10^{-6}$ $K^{-1}$
Cast iron: $10.5 \times 10^{-6}$ $K^{-1}$ In a particularly advantageous manner and as represented in FIG. 1B and FIG. 2, the external wall 6 is crossed by at least one end of the tubes 4.

Figure 3:
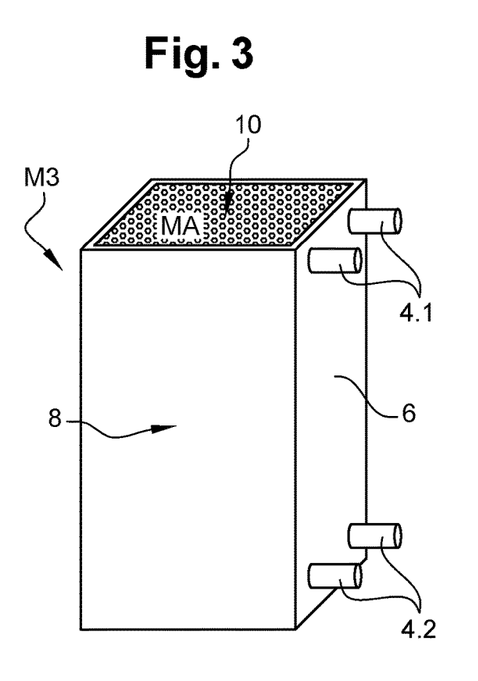
FIG. 3 is a schematic representation of another example of a portion of a module of a thermal storage system according to the invention, wherein a portion of the walls of the module is made during moulding of the matrix.

In FIG. 3, another example of a module M3 can be seen wherein the two ends 4.1, 4.2 of the tubes 4 cross the wall 6.

In the case where the ends of the tubes cross distinct walls, for example opposite walls, the two external walls crossed by the tubes may consist of solid walls.

The modules in which the tubes cross the solid wall(s) are substantially simpler to manufacture than the existing systems as they do not require affixing one or several plate(s) to be fastened to the tubes for example by welding or expanding.

Alternatively, the solid walls are distinct from those crossed by the ends of the tubes.

In FIG. 3, the module includes five of its six external walls made integral with the porous matrix MA; the wall 6 crossed by the ends of the tubes and the other walls designated by the reference 8. A face 10 of the porous matrix is left free, on the one hand, to enable filling of the matrix with the PCM material and, on the other hand, to enable the free expansion of the PCM material during the change of its state. The pores of the matrix are open-through, which enables the PCM material to penetrate into the matrix from the external face 10 of the porous matrix. A gas cloud may be formed at the free wall of the porous matrix, for example a cloud of an inert gas in the case where the PCM material is sensitive to oxidation in the operating conditions of the storage system.

In another embodiment, five of the six walls are made by moulding on the matrix in a material different from that of the matrix.

Alternatively, the tubes open by the free face 10 of the matrix.

Figure 4:
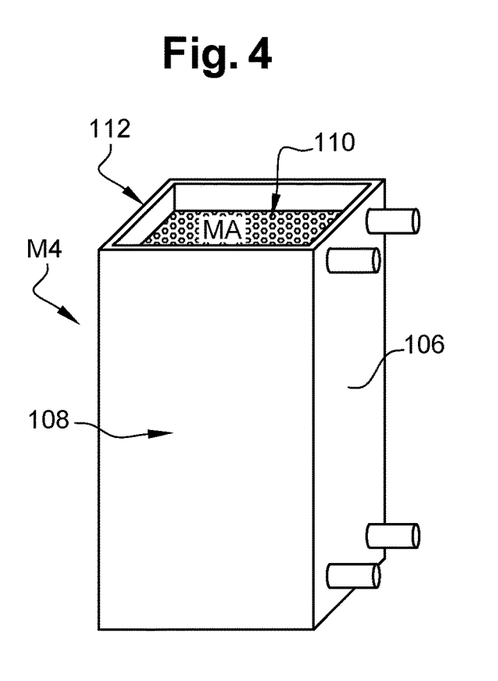
FIG. 4 is a schematic representation of another example of a portion of a module of a thermal storage system according to the invention, wherein a portion of the walls of the module is also made during moulding of the matrix and whose porous medium does not occupy the entire height between the walls.

In FIG. 4, a thermal storage module M4 according to an embodiment can be seen wherein the external walls 106 and 108 bordering the free surface 110 advantageously extending beyond the free surface 110, so as to form a flange 112 bordering the free surface 110. Advantageously, this flange 112 may delimit a tank for the PCM material.

When the PCM material expands during melting thereof, the PCM material then comes out by the free surface of the porous matrix and this tank allows containing the PCM material when it switches into the liquid state.

Furthermore, this flange 112 advantageously enables fastening of a cover (not represented) to close the volume, whether tightly or not, delimiting a cloud of gases, whether inert or not, and facilitating handling of the thermal storage module.

In the modules M1 and M2, the tubes 4 are rectilinear and the heat-transfer fluid flows only according to one flow direction during a load or unload phase.

Advantageously, the tubes are such that the module has a hydraulic configuration in multiple passes, i.e. the heat-transfer fluid in each tube flows successively during its flow in the porous matrix in different, for example opposite, directions between the two ends of the tube during a load and unload phase.

Figure 5:
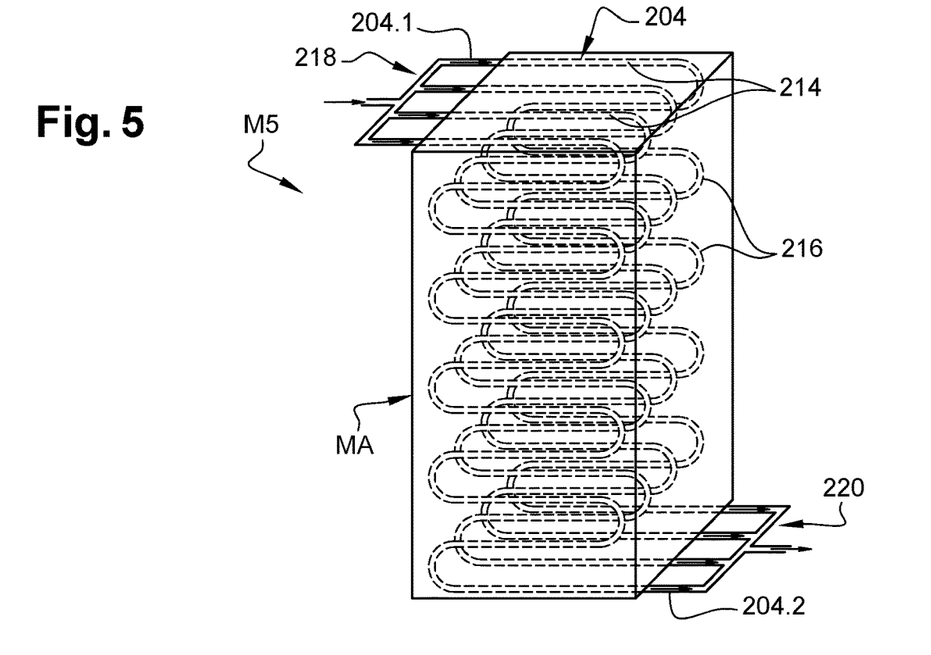
FIG. 5 is a schematic representation of another example of a portion of a module of a thermal storage system according to the invention, the heat-transfer fluid tubes being made in the form of a serpentine.

In FIG. 5, another example of a module M5 can be seen wherein the tubes 204 have a serpentine shape with parallel portions 214 connected by elbows 216 between the two ends of the tube 204.1, 204.2. In this example, the module includes four tubes 204 disposed in vertical distinct parallel planes and each tube 204 includes nine parallel rectilinear portions 214, i.e. the heat-transfer fluid flows while performing nine passes in the porous matrix.

In this example, the straight portions 214 are horizontal but any other direction could be considered. Furthermore, each tube is contained in a plane. Alternatively, it could be considered to make tubes contained in several planes. In this example, the tubes are connected in parallel by supply/collection feeders 218, 220, depending on whether it consists of a load phase or an unload phase.

The multi-pass configuration allows increasing the velocity of the heat-transfer fluid, and therefore the convective heat-exchange coefficient of the heat-transfer fluid, and therefore the overall exchange coefficient between the heat-transfer fluid and the PCM material.

Preferably, the flow direction of the heat-transfer fluid during the load and unload phases is such that the volume of the PCM material could change during the phase changes while applying reduced stresses, and possibly without applying any stresses on the structure.

In the case of a PCM material whose volume increases during the switch into the liquid state, preferably the supply of hot heat-transfer fluid is performed by the upper portion of the module, thus the PCM material located in the upper portion of the module could expand towards the free surface. Preferably, the supply of cold fluid is then performed by the bottom of the module.

Figure 6:
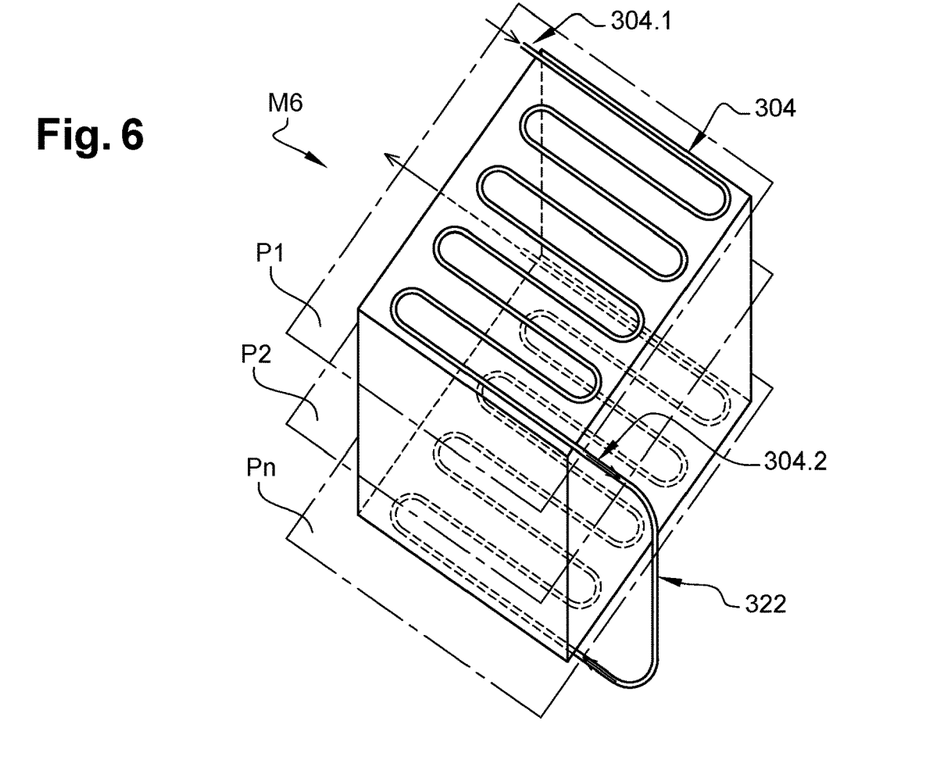
FIG. 6 is a schematic representation of another example of a portion of a module of a thermal storage system according to the invention, the heat-transfer fluid tubes being also in the form of a serpentine.

In FIG. 6, another example of a thermal storage module M6 can be seen including multi-pass type tubes 304, each contained in a horizontal plane. Preferably, the tubes 304 are hydraulically connected in series. Preferably, the series connection is achieved by connectors 322 located outside the matrix. For example, the connectors are affixed after moulding of the matrix around the tubes 304.

It is the same heat-transfer fluid that flows in the different tubes. Preferably and as explained hereinabove, the hot heat-transfer fluid flows at first in the tube located at the top of the module and then successively in the other tubes.

In this configuration, the heat-transfer fluid penetrates into the module by the end 304.1 of the tube 304 and flows in a first upper plane P1 through the entire section of the module in a horizontal plane, comes out from the tube 304 by the end 304.2 and from the matrix, flows in the connector 322 and penetrates into the tube located in the plane P2 and winds in the plane P2 and so on until joining the tube located in the plane Pn, and finally comes out from the module, n being a positive integer.

Preferably, the supply with hot heat-transfer fluid is done by the tube located at the upper portion of the module.

Alternatively, the serpentine tubes in a plane could be replaced by exchanger plates integrated in the porous matrix. Preferably, the exchanger plates are directed vertically. It should be understood that it is preferable to ensure a loading and an unloading and therefore a meltdown and a solidification of the PCM material in a vertical direction and preferably from the top to the bottom and from the bottom to the top respectively. Nevertheless, alternatively, the tubes may be distributed so that loading and unloading are done in an essentially horizontal direction, the module is then configured so that the meltdown and the solidification of the PCM material do not apply or slightly apply a mechanical stress to the porous matrix.

Figure 7:
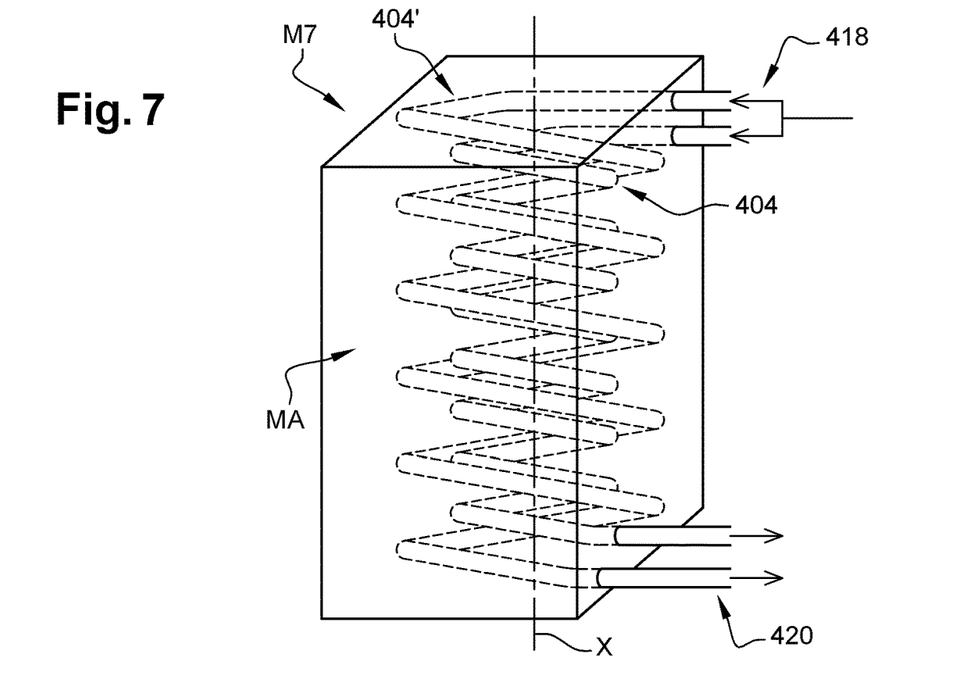
FIG. 7 is a schematic representation of another example of a portion of a module of a thermal storage system according to the invention, wherein the tubes are helical.

In FIG. 7, another embodiment of a module M7 can be seen, wherein the tubes 404, 404' are bent so as to form coils winding around the longitudinal axis X. In this example, two tubes with different coil diameters. The tube 404 is concentrically disposed inside the tube 404'. The two tubes are fed in parallel by a supply feeder 418 and the fluid coming out of the tubes is collected by an evacuation feeder 420.

The tube 404 located inside primarily ensures a heat transfer to the PCM located the innermost in the module, and the tube 404' located outside primarily ensures a heat transfer to the portion radially the outermost of the PCM material. In this example, the module has a parallelepiped shape.

Figure 8:
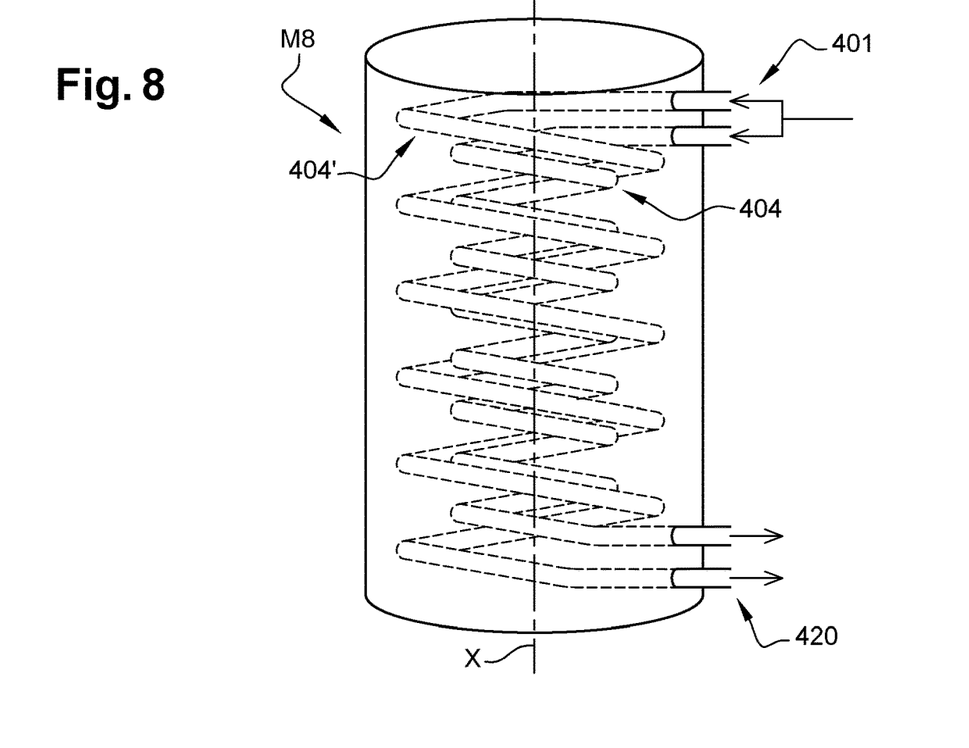
FIG. 8 is a schematic representation of a variant of the module of FIG. 7, wherein the porous matrix is cylindrical shaped.

In FIG. 8, a variant can be seen wherein the module M8 has advantageously a cylindrical shape with a circular section, which enables a more uniform distribution of heat to the PCM material and collection of heat from the PCM material, in particular in the PCM material located outside the external tube.

The porous matrix, and more generally the module, may have any shape, which allows adapting to constraints relating to thermal energy storage capacity and/or to integration in its operation environment.

In the described examples, the tubes have a circular section. Alternatively, it has a flattened shape at the portion contained in the porous matrix, and connecting ends with a circular section facilitating the connection of the tubes to the distributor and the collector.

In the described examples, the fluid flowing in the tubes originates from the same hot source or cold source, it is therefore the same fluid that flows in all tubes in parallel or in series.

In another embodiment, the storage module includes several separate circuits for heat-transfer fluid flow, for example to make different heat-transfer fluids flow. Indeed, some applications require providing at least two distinct inner heat-exchangers, each supplied with a different heat-transfer fluid. For example, a first heat-transfer fluid is used to bring in heat to the thermal storage thereby causing the meltdown of the PCM material, whereas the second heat-transfer fluid is used to unload the thermal storage by recovering the heat generated by the solidification of the PCM material. For example, this configuration is found when the thermal storage system is at the interface between a source that produces heat, for example a heat pump, and a system that converts the heat into electricity at the most opportune time, for example a Rankine organic cycle machine. The heat-transfer fluids found in this type of configuration often consist of two-phase refrigerating fluids. Such a thermal storage means, provided with two distinct inner heat-exchangers, is also particularly interesting on heat networks where it is advantageously positioned at the interface between the primary circuit at a higher temperature and the secondary circuit at a lower temperature. According to this integration scheme, the thermal storage means would operate in parallel to the usual heat-exchanger that ensures the heat transfer between the primary circuit and the secondary circuit. In this design, the first inner heat-exchanger of the thermal storage means is supplied with the heat-transfer fluid flowing in the primary circuit, whereas the second inner heat-exchanger of the thermal storage means is supplied with the heat-transfer fluid flowing in the secondary circuit. Thus, considering that the temperature is higher in the primary circuit is higher than in the secondary circuit, such a thermal storage means at the interface between the two circuits, is supplied by the primary circuit for loading thereof, i.e. causing the meltdown of the PCM material and therefore the recovery and storage of heat, and would then be supplied by the secondary circuit for unloading thereof, i.e. causing the crystallisation of the PCM material and therefore the recovery of the stored heat. The PCM material is selected according to its liquid/solid state change temperature so that the supply temperature of the primary circuit is enough to cause the meltdown of the PCM material and the supply temperature of the secondary circuit is enough to cause the crystallisation of the PCM material.

In one example, the heat-exchangers are made by means of two coaxial tubes, the first heat-transfer fluid flows in the inner tube whereas the second heat-transfer fluid flows in the annular channel formed between the inner tube and the outer tube, the first fluid then exchanges heat with the PCM material through the two tubes and the first heat-transfer fluid. In another example, the two heat-exchangers are distinct and with different structures or not. Thus, it is possible to select the structure of each heat-exchanger that is the most efficient in terms of heat transfer for the heat-transfer fluid flowing in each heat-exchanger.

As already mentioned hereinabove, the invention implementing a porous matrix moulded around one or several heat-exchanger(s) offers a great freedom in terms of shape and final geometry of the thermal storage modules of these. Quite advantageously, the modules may be parallelepiped shaped, which allows facilitating their integration and maximising their useful volume with regards to the surface they occupy on the ground, which reduces the space occupied on the ground by the thermal storage system. In contrast, the storage systems of the prior art generally include cylindrical grills to contain the PCM material, having a larger footprint with regards to their volume.

Moreover, this parallelepiped shape allows associating several modules by easily juxtaposing and/or stacking them and fitting to the best to the available footprint, and by fluidly connecting them in parallel or in series.

Figure 9:
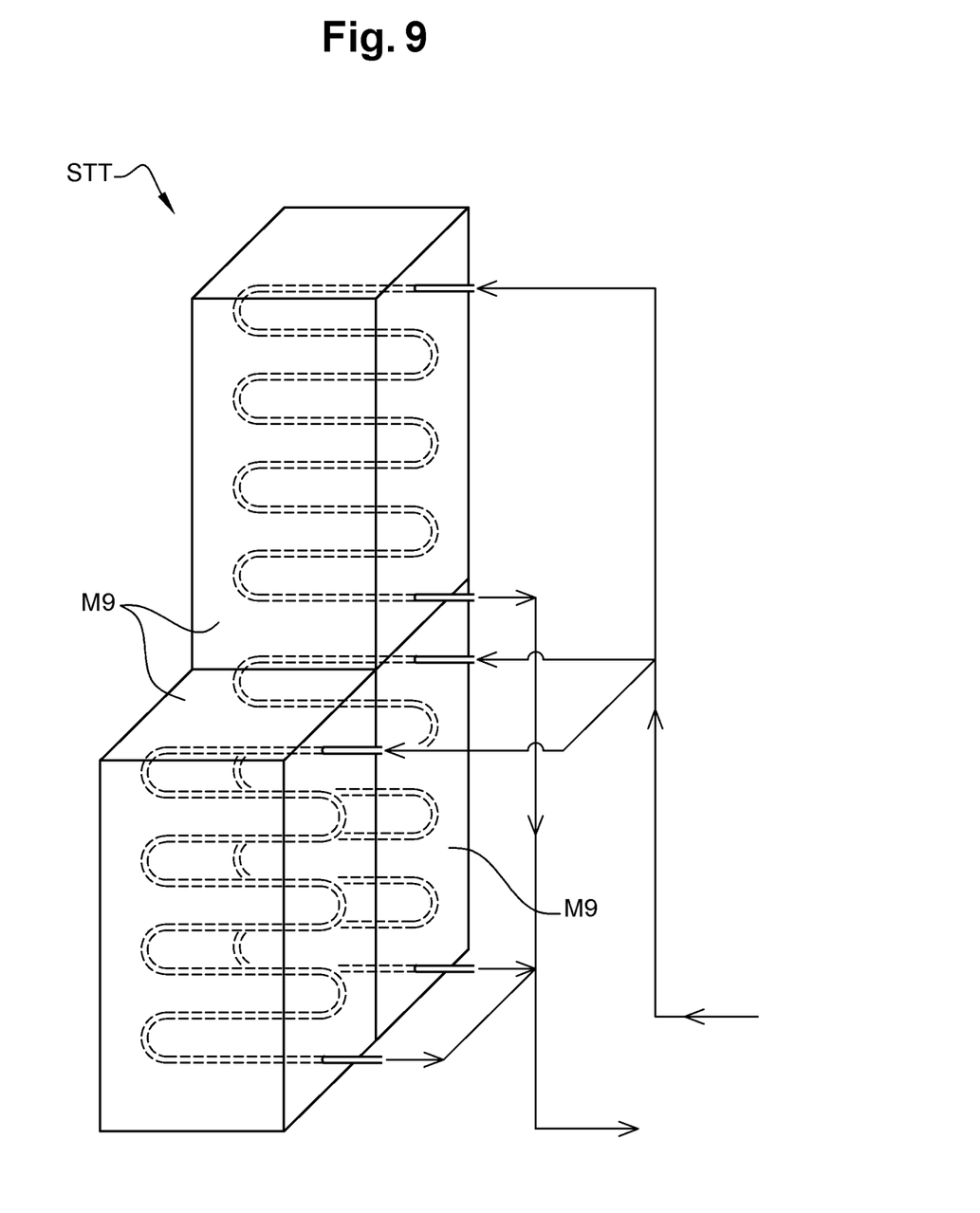
FIG. 9 is a schematic representation of a thermal storage system including several modules.

In FIG. 9, a schematic of a thermal storage system STT including three modules M9, two modules M9 being stacked and two modules M9 being juxtaposed and in contact by an external face can be seen. The three modules M9 are connected in parallel to a network. They are supplied with a heat-transfer fluid in parallel by the network and discharge the fluid in parallel in the network. Alternatively, they may be connected in series or some are connected in parallel and others connected in series.

It may be considered to be able to hydraulically isolate one or several module(s), for example by means of a valve, so that these do not store heat or do not deliver it according to the amount of heat to be stored or to be recovered, respectively, for example according to the season. Such a storage system offers a great flexibility of operation.

As an example, each module may have the following dimensions: 0.5 m×0.5 m×1 m and an outer volume (excluding the hydraulic connections and excluding the heat insulation) of about 0.25 m$^3$. Such dimensions enable an easy stacking of the modules. The porous matrix may have a porosity comprised between 80% and 95% occupied almost completely by the PCM material, such a module may then contain between about 200 litres and 237 litres of PCM material. Each module may store a thermal energy comprised between 10 and 20 kWh.

As an example, considering a substation of a heat network provided, opposite one wall, with a free volume for heat storage with a 0.5 m×1 m footprint on the ground over a height of 3 m it would be possible to install a thermal storage unit composed by a stack of six unit modules having a total volume of 1.5 m$^3$. The same system composed by two cylindrical vats with a conventional design would have only total volume of 1.17 m$^3$, namely at minimum less 20% of thermal energy storage capacity.

The invention allows clearing space to store PCM material.

The method implemented to manufacture the storage device according to the invention enables an overmoulding of the foam directly on the tubes, which was not possible with any other type of stochastic foam.

Overmoulding of the aluminium foam on the steel tubes ensures a stressing of the steel/aluminium interface guaranteeing a tight and long-lasting metal/metal bond.

The integration of the heat-exchangers in the foam allows for a better heat transfer between the heat-transfer fluid and the PCM material, which allows reducing the number of heat-exchangers, for example the number of tubes. Using less tubes offer the possibility of using hydraulic feeders for the hydraulic distribution and the hydraulic collection of the heat-transfer fluid at the connecting ends of the heat-exchangers. The use of hydraulic feeders offers several advantages. First of all, it allows getting rid of the use of water header box involving resorting to plates to achieve the interface with the tube harness often used in the conventional design. The use of plates, also called tube collector plates, involves numerous and expensive assembly operations (obtained by welding or by expanding) to achieve the connection between the plate(s) and the tubes. Thus, two assembly operations per tube should be provided for. These assembly operations may further form weakened areas once they involve welding operations.

The use of hydraulic feeders also simplifies the assembly operations.

The welds are performed outside the thermal storage module between the connecting ends of the heat-exchangers and the feeders.

Advantageously, the connection by welding is done "end-to-end" or through the use of fittings, for example union-type ones, allowing for a better mechanical strength as tube connections on usual tubular plates. On the other hand, the possibility of making welded connections outside the module facilitates their accessibility, in particular for periodic control/inspection operations. Furthermore, avoiding the use of water header boxes for the hydraulic distribution and collection of the heat-transfer fluid of the mould by using instead of the hydraulic feeders allows reducing the volume of heat-transfer fluid contained in these components. In the case where the heat-transfer fluid is pressurised, the possibility of reducing the volume contained in the module allows lightening and limiting constraints on the design, in particular in case of using a pressurised fluid.

The reduction of the number of tubes allows avoiding the need for inserts, thereby reducing the cost and the complexity of the module. The storage energy density of the module may be increased to the extent where volume cleared by the less tubes could be replaced with PCM material. The absence of inserts in the tubes may reduce the risks of fouling in the tubes in some cases.

An example of a method for manufacturing the thermal storage module M1 will now be described. FIGS. 10A to 10F schematically represent different steps of an example of a method for manufacturing a thermal storage module.

Figure 10A:
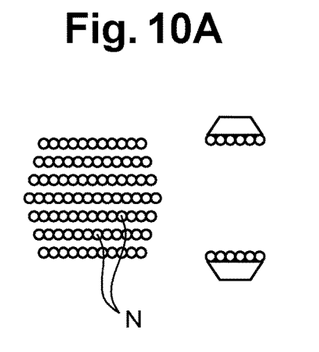
FIGS. 10A-10F are schematic representations of different steps of an example of a method for manufacturing a thermal storage module.

First of all, cores that are manufactured by aggregation of elements by means of a binder, for example a polyurethane, are provided. The elements are placed in a mould with a shape corresponding to that of the preform PR that we wish to make in order to obtain the cores N. To guarantee a proper stacking of the cores in a mould, the elements are deposited layer by layer and the number of layers depends on the shape and the size of the preform PR.

Figure 10B:
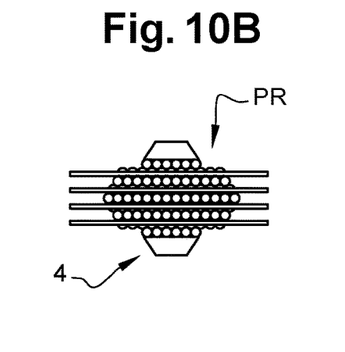

The steel tubes are placed in the layers of cores N, a space provided to this end is integrated, for example by CAD. Around each tube and between the cores, an aluminium layer embeds the steel tube to maximise the overmoulding and the thermal connection (FIG. 10B).

Figure 10C:
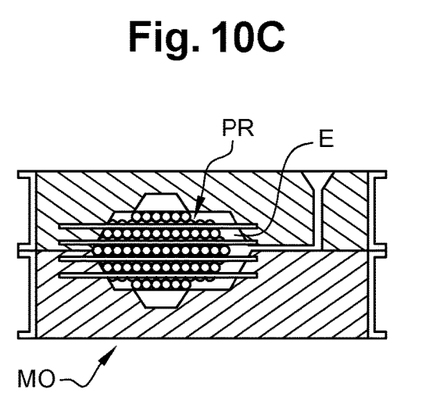

The preform PR is disposed in a mould MO (FIG. 10C). For example, the mould is made of sand or of a metallic material. The mould and the arrangement of the preform in the mould are such that an empty space E between the preform and an inner wall of the mould MO is formed so that, during moulding, a solid wall 6 in the material of the matrix is formed over a face of the porous matrix and around the ends of the tubes.

Figure 10D:
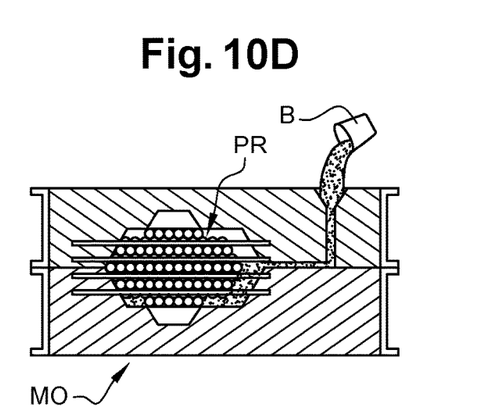
Figure 10E:
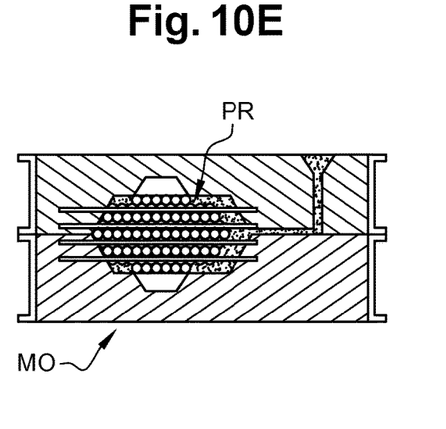
Figure 10F:
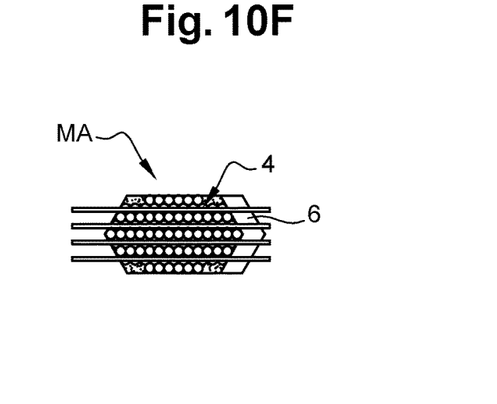

During a next step represented in FIG. 10D, a metal, for example aluminium, bath B is prepared and then the liquid metal is infiltrated in the preform. The filling system and the temperature of the metal are adapted to the configuration of the matrix to be manufactured. Software allowing calculating the distances of metal infiltration may be used. The metal is solidified (FIG. 10E), at this level, the preform is still contained in the part and should therefore be destroyed. For this purpose, the part is immersed in a solvent, so that the preform is dissolved. The part obtained after destruction of the preform has two types of areas: areas made of hollow foam, in place of the preform, and solid areas made of alloy in place of the empty space. Thus, the part may have a "skin" around the foam area (FIG. 10F).

The metal is finished and the module is completed in particular by affixing the other portions of the vat, for example by welding.

Afterwards, the module may be filled with PCM material. This filling of the module with PCM may take place when the module is in place and connected to the heat-transfer fluid network to ensure the supply of heat required for melting the PCM. During filling, the PCM may be supplied in the form of a powder, in the form of granulates with a diameter of a few millimetres (in general between 1 mm and 3 mm) or directly in the liquid form, i.e. after having been heated up beforehand to be molten).

The method for manufacturing the matrix may include control of the shape of the cores, a control of the porosity of the metal before casting, a measurement of the temperature of the metal before casting, a check-up of the metallurgy of the metal before casting.

Figure 11:
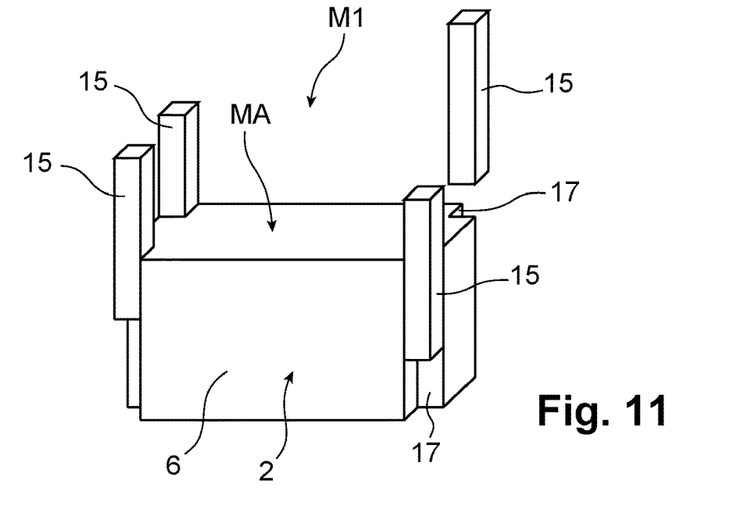
FIG. 11 is a perspective view of a thermal storage module, according to another preferred embodiment of the invention.
Figure 12:
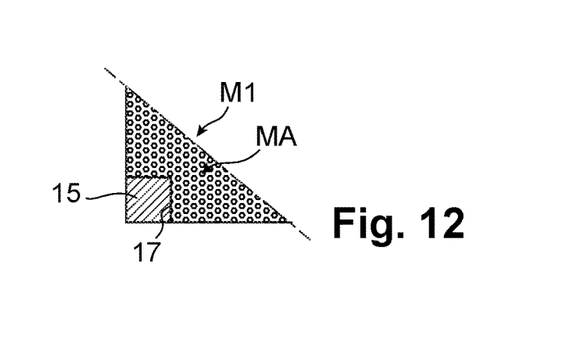
FIG. 12 is a longitudinal sectional view of the module shown in FIG. 11.

According to another preferred embodiment of the invention, represented in FIGS. 11 and 12, the matrix MA is equipped at some of its edges with uprights 15. In this case, there are four uprights 15, in the form of stringers, equipping the four matrix edges directed vertically.

The uprights 15, also parallel to each other and directed vertically, may be made of a material different from that of the matrix MA. For example, to confer a better mechanical strength on the module, and therefore fill a structural function, steel may be used, or any other material having such properties.

The uprights 15 preferably feature a square or rectangular section, solid or hollow, for example in the form of profiles. They may be machined, drilled or threaded to facilitate the assembly of possible elements on their surface, such as support feet, interlocking elements, lift members such as shackles.

According to another embodiment, the stringers may also be drilled on their wall in contact with the matrix MA so as to enable, during the moulding operation, the penetration of the (molten) material of the matrix through or inside the stringers. After the phase of solidification of the material of the matrix, this embodiment will allow securing the stringer(s) 15 with the matrix MA. Of course, depending on this embodiment, the stringers are inserted/assembled with the cores during mounting thereof before casting of the material of the matrix. This embodiment ultimately makes the stringers and the matrix secured and non-detachable.

The four uprights 15 fit perfectly in the parallelepiped geometry of the matrix MA and of the entire module. For this purpose, the matrix MA features a material setback/recess at each of its considered edges, with a shape complementary to that of the received upright. Hence, this setback 17, also called clearance, has a right-angled shape, open towards the outside of the module.

The assembly is such that the external surfaces of the uprights 15 are flush with or substantially flush with the adjacent external surfaces of the matrix.

There are two possibilities for the integration of the uprights 15. The first one consists in integrating the uprights to the matrix MA directly during moulding thereof. In this case, the uprights 15 may have a surface structured so as to promote adhesion and cohesion with the porous matrix mould on these uprights.

The second possibility consists in the integration of these uprights 15 only after having obtained the matrix MA by moulding. In this case, the obtainment of the setbacks 17 on the matrix MA is performed by adapting the geometry of the cores in the mould. These setbacks are then preferably defined with solid areas, like those of the solid walls that define all or part of the vat 2 at the external surface of the matrix.

Figure 13:
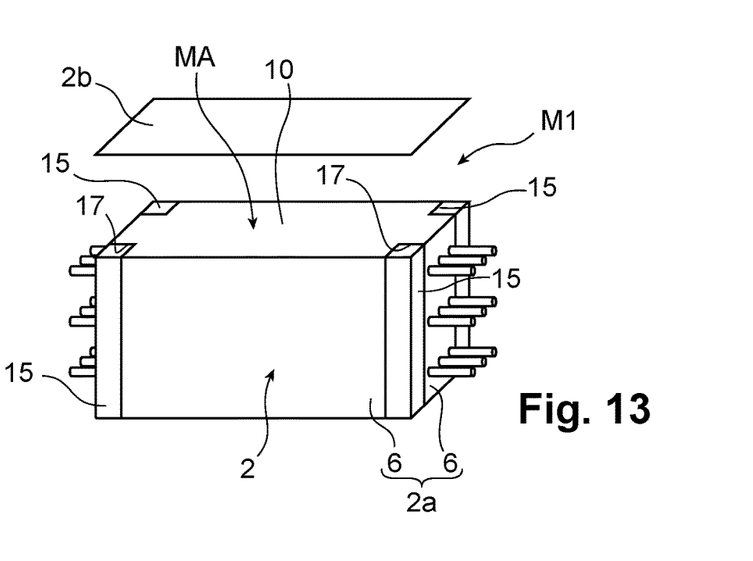
FIG. 13 is a perspective view of a thermal storage module, according to one alternative.

In an alternative shown in FIG. 13, the module M1 is similar to the module M3 shown in FIG. 3, to the extent that the vat 2 is formed using a vat body 2a, closed by a cover 1b covering a free face 10 of the porous matrix MA. In this configuration, the presence of the uprights 15 at the vertical edges of the matrix MA allows facilitating and reinforcing fastening of the cover 2b on the module.

Figure 14:
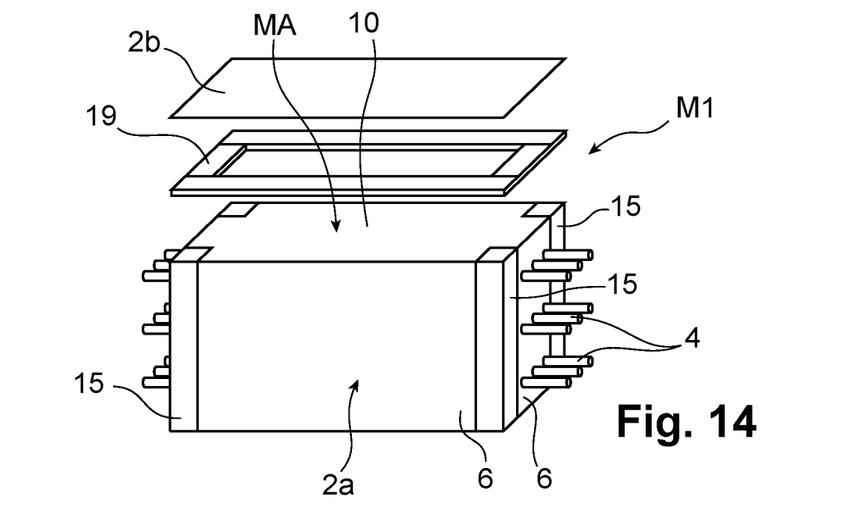
FIG. 14 is a perspective view of a thermal storage module, according to another alternative.

According to another alternative represented in FIG. 14, a frame 19 is affixed between the cover 2b and the top ends of the uprights 15, on which this frame 19 is affixed. For example, this frame has an L-shaped section, facilitating the assembly by mechanical clamping of the cover 2b on the frame 19.

Figure 15:
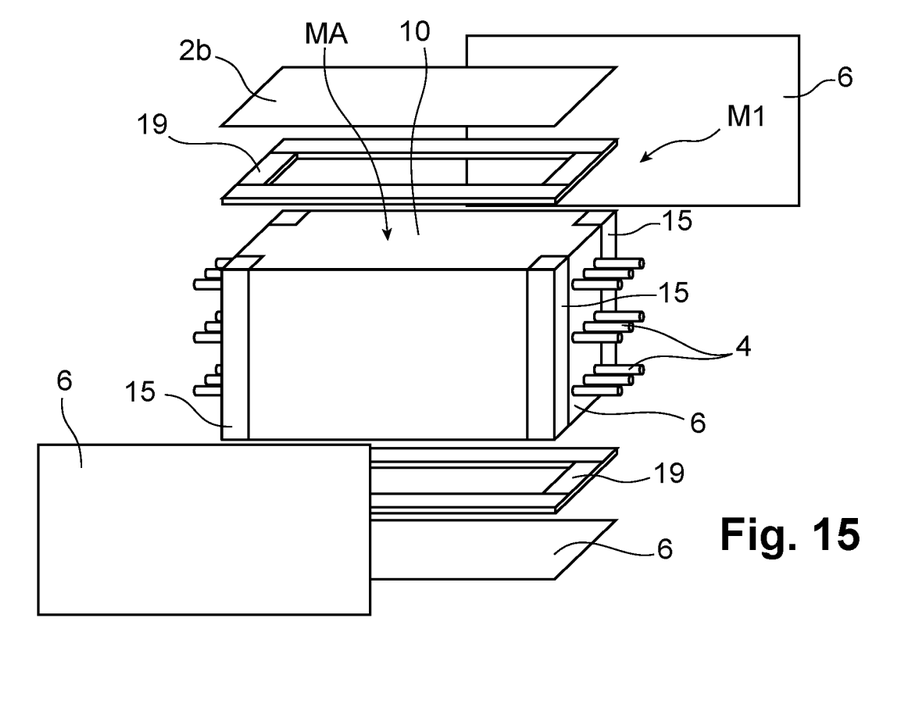
FIG. 15 is a perspective view of a thermal storage module, according to yet another alternative.

According to yet another alternative shown in FIG. 15, some of the walls 6 forming the vat body are no longer made directly by moulding and integral with the matrix MA, but affixed on the module after moulding of the matrix. The uprights 15 and the frame 19 then facilitate the assembly thereof and reinforce the mechanical strength of the obtained set. Besides, another similar frame 19 may be arranged on the opposite face of the matrix, and fastened to the bottom ends of the uprights 15 to receive one of the affixed solid plates intended to form the vat. In this case, the loads transmitted through the uprights 15 could be properly distributed in each of the frames 19.

For fastening of the solid plates 6, the uprights 15 may be pre-equipped with fastening means such as threaded pins (not represented), thereby facilitating mounting by clamping of these walls 6 which are affixed, rather than being made integral with the matrix MA. It is also possible to provide for a smooth external surface on these uprights 15, so as to receive a sealing gasket crushed between these uprights and the solid plates 6 supported thereby.

Of course, various modifications may be made by a person skilled in the art to the invention that has just been described, only as non-limiting examples, and whose scope is defined by the appended claims. In particular, the different embodiments that have been described can be combined, and their features can be interchanged.

The invention claimed is:

1. A method for manufacturing a module including:
a vat,
at least one heat-exchanger including first and second connecting ends configured to be connected to a heat-transfer fluid network, the first and second connecting ends penetrating and opening into the vat, and
a structure received in the vat and configured to contain a phase-change material, the structure comprising a porous matrix with communicating cells crossed by the heat-exchanger and in contact with an external surface of the heat-exchanger, and the matrix being obtained by moulding around the heat-exchanger, and the vat comprising at least one wall made of a material formed by moulding directly on the porous matrix, the method including:
providing a preform comprising plates of cores and at least one heat-exchanger between the cores,
setting up the preform in a mould,
introducing a liquid metal in the preform,
solidifying the metal, and
removing the cores.

2. The manufacturing method according to claim 1, wherein the preform includes a free volume between the cores and the heat-exchanger.

3. The method according to claim 1, wherein
the at least one wall comprises a bottom wall and at least one side wall arranged crossing to the bottom wall and connected to the bottom wall; and
each of the bottom wall and the at least one side wall is formed directly during moulding of the matrix and is integral with the matrix.

4. The method according to claim 1, wherein the at least one wall is formed on the matrix after moulding thereof.

5. The method according to claim 4, wherein the at least one wall is made of a material having a thermal conductivity lower than that of the matrix.

6. The method according to claim 1, wherein the at least one wall is crossed by at least the first end of said heat-exchanger.

7. The method according to claim 1, wherein the porous matrix is made of a metallic material.

8. The method according to claim 1, wherein the matrix includes a first area with a first material having first porosity in contact with the external surface of the heat-exchanger and a second area with a second material different from the first material and having a second porosity surrounding the first area, the second porosity being higher than the first porosity.

9. The method according to claim 1, including several heat-exchangers configured to be connected in parallel to a heat-transfer fluid network and wherein the first connecting ends are connected to a hydraulic feeder and the second connecting ends are connected to a second hydraulic feeder.

10. The method according to claim 1, wherein the heat-exchanger is a tube.

11. The method according to claim 10, wherein the tube is configured so as to wind in the matrix.

12. The method according to claim 11, including several tubes, each tube being contained in a plane, the planes being substantially vertical, and wherein the tubes are configured to be connected in parallel to a heat-transfer fluid network.

13. The method according to claim 11, including several tubes, each tube being contained in a plane, the planes being substantially horizontal and wherein the tubes are connected in series.

14. The method according to claim 13, wherein the tubes are connected by connectors disposed outside the matrix.

15. The method according to claim 1, wherein the matrix is parallelepiped shaped.

16. The method according to claim 15, wherein the matrix is equipped, at least at one of its edges, with an upright.

17. The method according to claim 15, wherein the vat includes five walls in contact with a face of the matrix and a wall distant from a matrix face so as to clear a free volume between the face and the wall.

18. The method according to claim 17, wherein the five walls are made of a metallic material formed directly during moulding and integral with the matrix or are formed on the matrix after moulding thereof.

* * * * *